US 6,562,496 B2

(12) United States Patent
Faville et al.

(10) Patent No.: US 6,562,496 B2
(45) Date of Patent: May 13, 2003

(54) INTEGRATED SOLID OXIDE FUEL CELL MECHANIZATION AND METHOD OF USING FOR TRANSPORTATION INDUSTRY APPLICATIONS

(75) Inventors: Michael T. Faville, Geneseo, NY (US); M. James Grieve, Fairport, NY (US); John G. Noetzel, Fairport, NY (US); Karl J. Haltiner, Jr., Fairport, NY (US); Christopher M. DeMinco, Honeoye Falls, NY (US); Kevin R. Keegan, Hilton, NY (US); John F. O'Brien, Lockport, NY (US); Subhasish Mukerjee, Rochester, NY (US); David R. Schumann, Spencerport, NY (US); Steven R. Shaffer, Fairport, NY (US); Juergen T. Kammerer, Weilach (DE); Catherine C. Vavonese, Rochester, NY (US); James M. Haller, Rochester, NY (US); Donald J. Armstrong, Troy, MI (US); Harry L. Husted, Kokomo, IN (US); Haskell Simpkins, Grand Blanc, MI (US)

(73) Assignees: Delphi Technologies, Inc., Troy, MI (US); Bayerische Motoren Werke Aktiengesellschaft (DE)

( * ) Notice: Subject to any disclaimer, the term of this patent is extended or adjusted under 35 U.S.C. 154(b) by 119 days.

(21) Appl. No.: 09/845,531

(22) Filed: Apr. 30, 2001

(65) Prior Publication Data
US 2002/0025458 A1 Feb. 28, 2002

Related U.S. Application Data
(60) Provisional application No. 60/201,568, filed on May 1, 2000.

(51) Int. Cl.[7] .......................... H01M 8/00; H01M 8/04; H01M 8/18; H01M 8/10

(52) U.S. Cl. .............................. 429/13; 429/17; 429/19; 429/30
(58) Field of Search .............................. 429/12, 13, 17, 429/19, 26, 29, 30, 34

(56) References Cited

U.S. PATENT DOCUMENTS

| | | | | |
|---|---|---|---|---|
| 5,413,879 A | * | 5/1995 | Domeracki et al. | 429/30 |
| 5,612,149 A | * | 3/1997 | Hartvigsen et al. | 429/26 |
| 5,750,278 A | * | 5/1998 | Gillett et al. | 429/24 |
| 6,077,620 A | * | 6/2000 | Pettit | 429/26 |
| 6,232,005 B1 | * | 5/2001 | Pettit | 429/19 |
| 6,280,864 B1 | * | 8/2001 | Towler et al. | 429/17 |
| 6,326,095 B1 | * | 12/2001 | Kneidel | 429/19 |
| 6,403,247 B1 | * | 6/2002 | Guthrie et al. | 429/34 |
| 6,440,596 B1 | * | 8/2002 | Ruhl et al. | 429/34 |

* cited by examiner

*Primary Examiner*—Carol Chaney
*Assistant Examiner*—Donald V. Scaltrito
(74) *Attorney, Agent, or Firm*—Vincent A. Cichosz

(57) ABSTRACT

A method of starting a solid oxide fuel cell system is disclosed. The method comprises pressurizing a main plenum to a first pressure. The main plenum comprises a first supply of fuel, blowers, and air control valves. The first supply of fuel and a first supply of air are directed to a preheated micro-reformer. A heated pre-reformate is created in the micro-reformer and discharged from the micro-reformer to a main reformer. The main reformer is preheated with the heated pre-reformate. A second supply of fuel and a second supply of air are introduced to the main reformer. A heated main reformate is created in the main reformer and directed to a waste energy recovery assembly. A cathode supply is heated in the waste energy recovery system and then directed to a solid oxide fuel cell stack in order to heat the solid oxide fuel cell stack. Methods of transitioning, operating, shutting down, and maintaining in standby mode are also disclosed. A solid oxide fuel cell mechanization for a transportation vehicle is also disclosed.

26 Claims, 2 Drawing Sheets

US 6,562,496 B2

INTEGRATED SOLID OXIDE FUEL CELL MECHANIZATION AND METHOD OF USING FOR TRANSPORTATION INDUSTRY APPLICATIONS

CROSS-REFERENCE TO RELATED APPLICATION

The present application claims the benefit of the date of U.S. Provisional Application No. 60/201,568, filed on May 1, 2000, which is incorporated herein in its entirety.

BACKGROUND

Alternative transportation fuels have been represented as enablers to reduce toxic emissions in comparison to those generated by conventional fuels. At the same time, tighter emission standards and significant innovation in catalyst formulations and engine controls has led to dramatic improvements in the low emission performance and robustness of gasoline and diesel engine systems.

One approach to addressing the issue of emissions is the employment of fuel cells, particularly solid oxide fuel cells ("SOFC"), in a transportation vehicle. A fuel cell is an energy conversion device that converts chemical energy into electrical energy. The fuel cell generates electricity and heat by electrochemically combining a gaseous fuel, such as hydrogen, carbon monoxide, or a hydrocarbon, and an oxidant, such as air or oxygen, across an ion-conducting electrolyte. The fuel cell generally consists of two electrodes positioned on opposite sides of an electrolyte. The oxidant passes over the oxygen electrode (cathode) while the fuel passes over the fuel electrode (anode), generating electricity, water, and heat.

A SOFC is constructed entirely of solid-state materials, utilizing an oxygen ion conductive oxide ceramic as the electrolyte. The electrochemical cell in a SOFC comprises an anode and a cathode with an electrolyte disposed therebetween.

Application and research efforts during the $20^{th}$ century, into using SOFCs, were generally concentrated in the stationary power generation industry. Because of those SOFC designs, the SOFC was not readily adaptable for use in a transportation vehicle. A transportation vehicle application imposes specific temperature, volume, and mass requirements, as well as real world factors, such as fuel infrastructure, government regulations, and cost. Several other types of fuel cell systems (i.e., proton exchange membrane (PEM) fuel cells) have been adapted for use in transportation vehicles, but require on-board storage or generation of hydrogen, which require complex water management systems for on-board fuel reforming and system hydration. The on-board storage and water management systems add cost and complexity to the overall system.

SUMMARY

The drawbacks and disadvantages of the prior art are overcome by an integrated solid oxide fuel cell mechanization.

A method of starting a solid oxide fuel cell system is disclosed. The method comprises pressurizing a main plenum to a first pressure. The main plenum comprises a first supply of fuel, blowers and air control valves. The first supply of fuel and a first supply of air are directed to a preheated micro-reformer. A heated pre-reformate is created in the micro-reformer and discharged from the micro-reformer to a main reformer. The main reformer is preheated with the heated pre-reformate. A second supply of fuel and a second supply of air are introduced to the main reformer. A heated main reformate is created in the main reformer and directed to a waste energy recovery assembly. A cathode supply is heated in the waste energy recovery system and then directed to a solid oxide fuel cell stack in order to heat the solid oxide fuel cell stack.

A method of transitioning a solid oxide fuel cell system to normal operating conditions is disclosed. The method comprises operating a main reformer to produce a reformate from a hydrocarbon fuel and directing the reformate in a first stream and second stream to a waste energy recovery assembly. The first stream is catalytically combusted in the waste energy recovery assembly, producing thermal energy to heat the second stream of the reformate and a cathode supply of air. The second stream of the reformate and the supply of air are directed to a solid oxide fuel cell stack. The solid oxide fuel cell stack is heated to a temperature of about 600° C. or greater.

A method of operating a solid oxide fuel cell system is disclosed. The method comprises directing a supply of reformate from a waste energy recovery assembly to a solid oxide fuel cell stack. The solid oxide fuel cell stack uses the supply of reformate and a supply of air to produce electrical energy. The electrical energy is harnessed, a condition of the reformate is sensed, and the supply of reformate and the supply of air are adjusted to meet a demand by a vehicle for the electrical energy.

A method of shutting down a solid oxide fuel cell system is disclosed. The method comprises maintaining a supply of air to the solid oxide fuel cell stack and at least one thermal enclosure. The supply of reformate to the solid oxide fuel cell stack is decreased. The supply of reformate is stopped after an anode oxidation period has passed. The supply of air to the solid oxide fuel cell stack is stopped.

A method of operating a solid oxide fuel cell system is disclosed. The method comprises directing a supply of reformate and a supply of air to a solid oxide fuel cell stack and operating the solid oxide fuel cell stack. The supply of reformate and the supply of air to the solid oxide fuel cell stack is reduced. The solid oxide fuel cell stack is maintained at a standby temperature of about 400° C. to about 600° C.

A solid oxide fuel cell mechanization for a transportation vehicle is disclosed. The mechanization comprises a solid oxide fuel cell stack in fluid communication with a reformer system, such that the reformer system comprises a main reformer and a micro-reformer. A waste energy recovery assembly is disposed in fluid communication with both the solid oxide fuel cell stack and the reformer system. A system enclosure is disposed around the solid oxide fuel cell stack, the waste energy recovery assembly, and the reformer system. A thermal management system is disposed within the system enclosure. The thermal management system comprises a main plenum and an insulation plenum enclosing a chamber. The chamber comprises the solid oxide fuel cell stack, the reformer system, and the waste energy recovery system. A process air supply is disposed in fluid communication with the thermal management system.

The above described and other features are exemplified by the following figures and detailed description.

BRIEF DESCRIPTION OF THE DRAWINGS

Referring now to the figures, wherein like elements are numbered alike.

DETAILED DESCRIPTION

Application of a SOFC in a transportation vehicle imposes specific temperature, volume, and mass requirements, as well as "real world" factors such as fuel infrastructure, government regulations, and cost to be a successful product. This SOFC power generation system design focuses on the power output necessary to serve as an auxiliary power unit on-board and not as the primary energy source of the vehicle. This auxiliary power unit would be carried on-board the vehicle as the electrical generator to supply the electrical loads that are on-board the vehicle. The design operates at higher overall efficiency (i.e., fuel energy input to electrical energy output) than current electromechanical alternator systems in current vehicles. The efficient operation of the SOFC system also permits electrical power to be generated on-board a vehicle even when the primary internal combustion engine is not operating (which will be important in meeting "no-idle" emissions laws being enacted in global regions).

Figure 1:
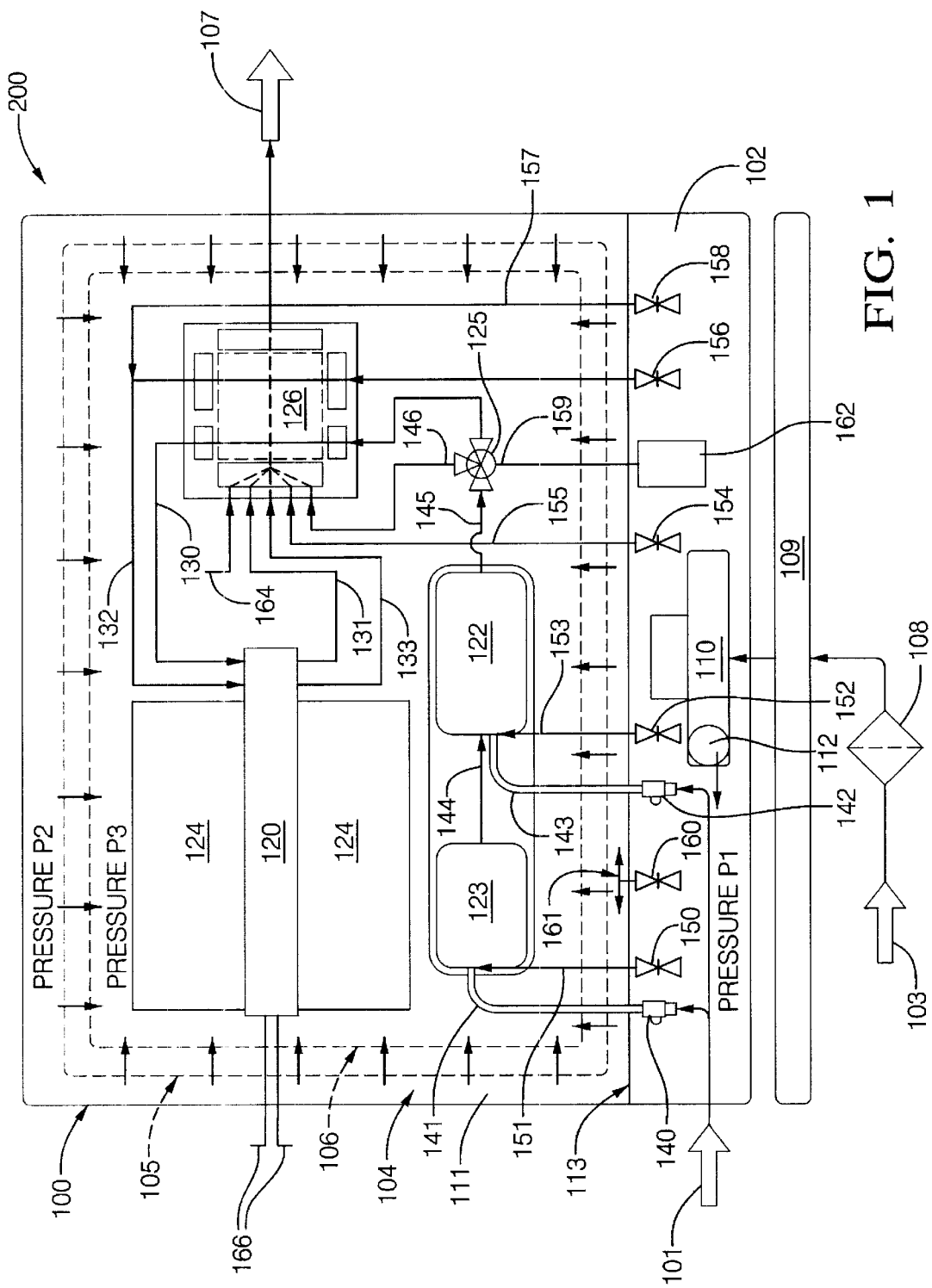
FIG. 1 is schematic of an exemplary system mechanization of a transportation industry SOFC system.

Referring now to FIG. 1, a detailed system mechanization of a SOFC system 200 is schematically depicted. The system enclosure 100 comprises a main plenum chamber 102, an insulation plenum chamber 104 and a hot box chamber 106. The main plenum chamber 102 comprises process air system controls (i.e., blowers, fuel injectors, air control valves). The insulation plenum chamber 104 comprises an open area 111 for air flow and an active porous insulation layer 105. The hot box chamber 106 can comprise a SOFC stack 124, including a gas distribution manifold 120, a main reformer 122, a micro-reformer 123, and a waste energy recovery (or heat exchanger) assembly 126.

A supply of air 103, exterior to the system enclosure 100, provides air to the SOFC system 200. The supply of air 103 is optionally processed in an air filter 108 and directed through a cooling air passage in the enclosure lid 109 to the main blower 110. The main blower 110 is located within the main plenum chamber 102, which is preferably separated from the insulation plenum chamber 104 by a plenum bulkhead plate 113. The air entering the main blower 110 exits through blower diffuser 112 into the process air system in the main plenum chamber 102. Also located within the main plenum chamber 102 are fuel injectors 140, 142, air control valves 150, 152, 154, 156, 158, 160, and an electrical actuator 162.

The main reformer 122, and optionally a micro-reformer 123, are provided with a supply of fuel 101 that can be disposed exterior to the system enclosure 100. Fuel can be supplied to the micro-reformer 123 through a fuel injector 140 and a fuel supply inlet 141, while air (or optionally water) can be supplied through an air control valve 150 and an air supply inlet 151. The micro-reformer 123 creates reformate and thermal energy that is directed via supply (or output reformate) 144 to the main reformer 122. An exterior fuel supply 101 is directed to the main reformer 122 through a fuel injector 142 and a fuel supply inlet 143, while air (or optionally water) can be supplied through an air control valve 152 and an air supply inlet 153. A supply of reformate 145 can be created in the main reformer 122 and directed to a reformate control valve 125. The reformate control valve 125 can be controlled by an electrical actuator 162 that controls the movement of the shaft 159 to distribute reformate to the waste energy recovery assembly 126.

The waste energy recovery assembly 126 receives an anode supply (i.e., reformate) 130 from the reformate control valve 125 and a cathode supply (i.e., oxidant or air) 132 from an air control valve 156. The anode supply 130 and cathode supply 132 are heated in the waste energy recovery assembly 126 and directed to the SOFC stack 124. A supply of air 157, through an air control valve 158, can be connected with the cathode supply 132.

To aid in heating the anode supply 130 and cathode supply 132, the waste energy recovery assembly 126 recovers the heated exhaust gases from the SOFC stack 124 via anode exhaust outlet 131 and cathode exhaust outlet 133. All or a portion of a supply of reformate 146 can be directed from the reformate control valve 125 to burn in the waste energy recovery assembly 126 for supplying fuel directly to the waste energy recovery assembly 126 combustor during start-up. An exterior supply of air 155 can be directed through air control valve 154 to the waste energy recovery assembly 126. The purge air located within the system enclosure 100 can also optionally be directed through air exhaust inlet 164 to be processed within the waste energy recovery assembly 126. A flow of reaction byproducts (e.g., water and carbon dioxide) and air 107 can be discharged from the waste energy recovery assembly 126 to the exterior environment of the system enclosure 100.

The SOFC stack 124 can be a multilayer ceramic/metal composite structure design to produce electricity at an operating temperature of about 600° C. to about 1,000° C., with about 600° C. to about 800° C. preferred. It can comprise one or more multi-cell modules (not shown) that are mounted to a common gas distribution manifold 120. Each module of the SOFC stack 124 produces a specific voltage that is a function of the number of cells in the module. Electrical attachment of the SOFC stack 124 is accomplished by way of electrodes 166 that lead out of the hot box 106 and system enclosure 100 to the vehicle power bus and system (not shown). The output voltage and current is controlled by the combination of these modules in series and parallel electrical connection, the air/fuel control system, and the electric load applied to the fuel cell system 200.

Figure 2:
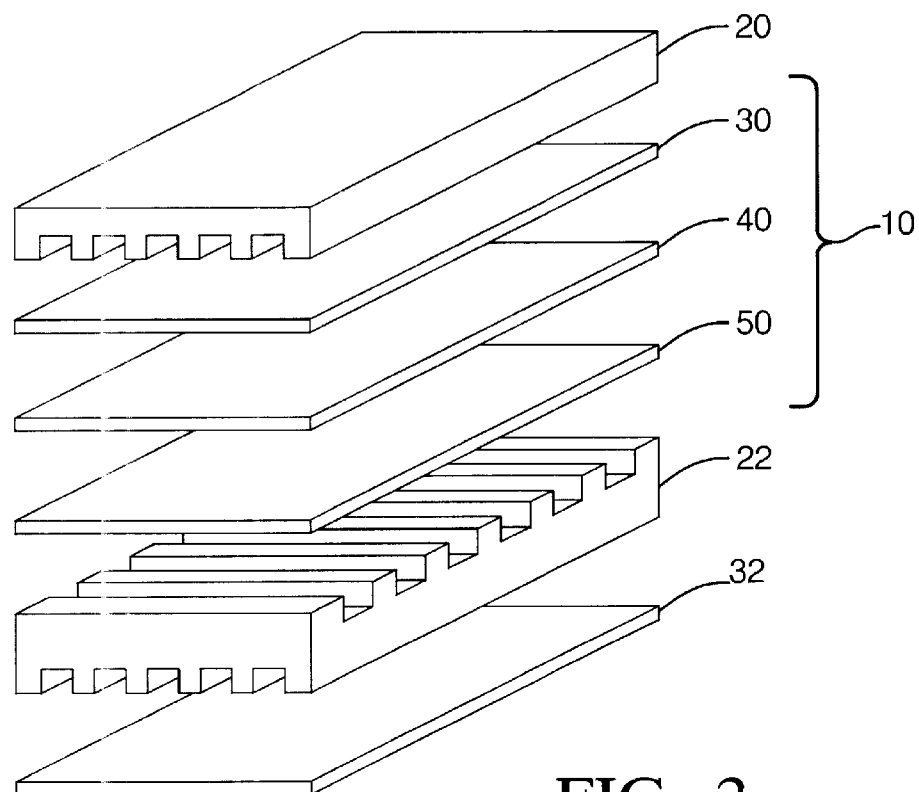
FIG. 2 is a perspective view of an exemplary electrochemical cell of a SOFC.

One configuration of a stack of planar SOFC 124 includes an electrochemical cell 10, as illustrated in FIG. 2. A fuel electrode (or anode) 30 and an oxygen electrode (or cathode) 50 are disposed on opposite sides of a solid electrolyte 40 to form an electrochemical cell 10. Two interconnects (or current collectors) 20, 22 are disposed on opposite sides of the electrochemical cell 10. An additional anode 32 is disposed adjacent to interconnect 22 to illustrate the placement of and ability to stack several electrochemical cells in electrical communication with electrochemical cell 10.

The solid electrolyte 40 of the electrochemical cell 10 can be an ion conductor capable of transporting oxygen ions from the cathode 50 to the anode 30, and which is compatible with the environment in which the SOFC will be utilized (e.g., temperatures of up to about 1,000° C.). Generally, solid electrolyte materials include conventional materials, such as ceramics (e.g., perovskite, fluorite, and the like) and/or metals (e.g., alloys, oxides, gallates, and the like), including zirconium, yttrium, calcium, cerium, magnesium, aluminum, rare earths, and the like, as well as oxides, gallates, aluminates, combinations, and composites comprising at least one of the foregoing materials. Preferably the electrolyte is a rare earth oxide (such as yttria, gadolinia, neodymia, ytterbia, erbia, ceria, and the like) doped with aliovalient oxide(s) (such as magnesia, calcia, strontia, and the like, and other $^{+2}$ valence metal oxides). More preferably, a yttria-stabilized zirconia electrolyte is utilized in the SOFC.

The anode 30 and cathode 50, which form phase boundaries (gas/electrolyte/catalyst particle; commonly known as triple points) with the electrolyte 40, can be disposed adjacent to or integral with the electrolyte 40. The anode 30 and cathode 50 are generally formed of a porous material capable of functioning as an electrical conductor and capable of facilitating the appropriate reactions. The porosity of these materials should be sufficient to enable dual directional flow of gases (e.g., to admit the fuel or oxidant gases and permit exit of the byproduct gases), with a porosity of up to about 40% useful, and about 20% to about 40% typically preferred.

The composition of the anode 30 and cathode 50 can comprise elements such as zirconium, yttrium, nickel, manganese, strontium, lanthanum, and, oxides, alloys, and combinations comprising at least one of the foregoing elements. Preferably, the anode material is formed upon a ceramic skeleton, such as yttria-stabilized zirconia, for thermal compatibility.

Both the anode 30 and the cathode 50 can be formed on the electrolyte 40 by a variety of techniques including sputtering, chemical vapor deposition, screen printing, spraying, dipping, painting, and stenciling, among others. The electrodes are typically up to about 1,000 microns or so in thickness, with a thickness of about 10 microns to about 50 microns typically preferred. An anode supported cell can also be used by forming the electrolyte 40 and the cathode 50 on the anode 30 by any of the above techniques. Alternate constructions are also contemplated with the cathode 50 or an inert layer (not shown) substituted as the support for the electrochemical cell 10.

The electrochemical cell 10 can be electrically connected with other electrochemical cells by using an interconnect 20, 22. Depending upon the geometry of the SOFC, the fuel and the oxidant flow to the anode or cathode (as appropriate) via the passageways of the interconnect 20, 22. The interconnect 20, 22 is generally formed of a material capable of withstanding the pressures and temperatures of the SOFC, and capable of conducting electricity. For example, suitable interconnects can be ceramic or metallic in the form of plates, foils, felts, mats, fibers (chopped, woven, non-woven, long, and the like), and the like, and combinations comprising at least one of the foregoing, which are capable of withstanding transportation vehicle operating conditions (e.g., ambient temperatures of about −40° C. up to SOFC operating temperatures of up to about 1,000° C.). The interconnect 20, 22 can be an electrically conductive material that is compatible with the oxidizing or reducing nature of the fuel cell environment. Some possible interconnects can comprise materials such as silver, copper, ferrous materials, strontium, lanthanum, chromium, chrome, gold, platinum, palladium, nickel, titanium, conducting ceramics (e.g., doped rare earth oxides of lanthanum, chromium, manganese, cobalt, nickel, and the like; doped zirconia, including, zirconia doped with titanium, copper, and the like), and the like, as well as alloys, oxides, cermets, composites, and combinations comprising at least one of the foregoing materials.

Each individual electrochemical cell 10 comprising a single anode 30, a single electrolyte 40, and a single cathode 50, generates a relatively small voltage as calculated using the Nernst equation of electrochemistry. This typically results in a voltage of less than 1.2 volts direct current, with greater than about 0.5 volts preferred. A single electrochemical cell 10 can have a voltage output of less than about 1.2 volts, based upon the electrical load applied to the electrochemical cell 10. Higher system voltages are attained by electrically connecting a plurality of electrochemical cells in series to form a stack. The total number of cells forming a stack can range from 2 to several hundred, depending on power requirements, space and weight restrictions, economics, and the like.

Figure 3:
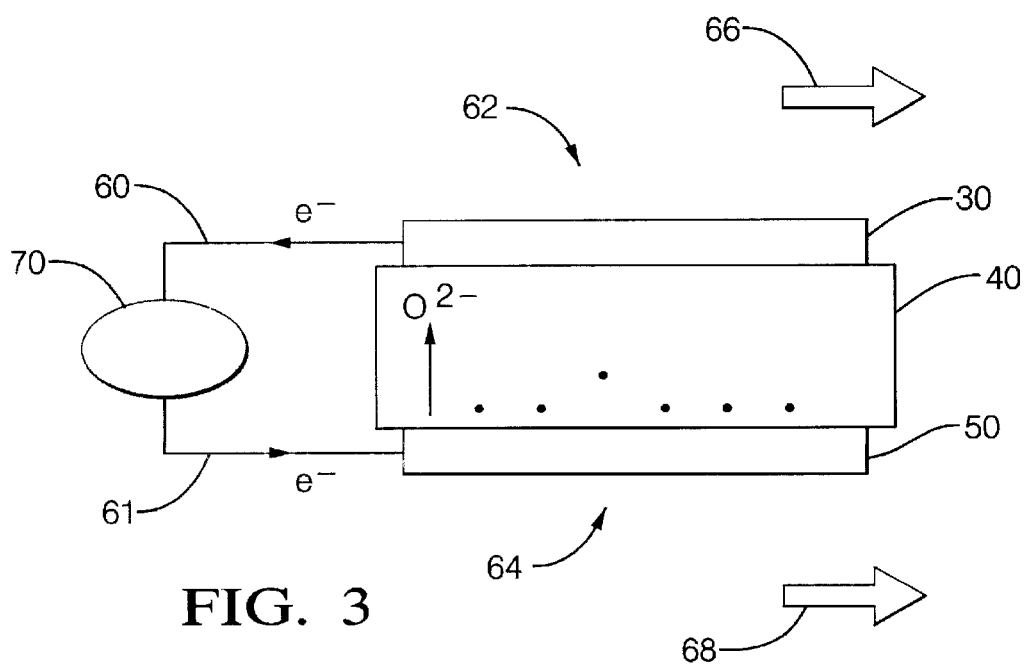
FIG. 3 is a schematic of an electrochemical cell of a SOFC in operation.

In operation, the electrochemical cell 10 produces a current flow as illustrated by current flow arrows 60, 61 in FIG. 3. Oxidant gases, such as oxygen or air, can be introduced to the cathode side of the cell, flowing as illustrated by the oxidant flow arrow 64. The oxidant is reduced in the presence of the oxygen ion conducting electrolyte 40 and an electric load and generates oxygen ions ($O^{-2}$), which move through the electrolyte 40 to the anode 30, as depicted in the following reaction:

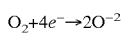
$$O_2 + 4e^- \rightarrow 2O^{-2}$$

At the anode, the fuel is oxidized in the presence of the electrolyte 40 and the migrating oxygen ions. The fuels, such as hydrogen, carbon monoxide, methane, or other hydrocarbons, in the form of a reformate, are introduced to the electrochemical cell 10 as illustrated by the fuel flow arrow 62. The reaction of the fuel and oxygen ions produces electrons ($e^-$), which flow outside of the electrochemical cell 10 to the external circuit 70 and back to the cathode 50. The fuel/oxygen ion reaction is depicted in the following reactions:

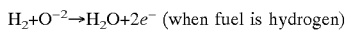
$$H_2 + O^{-2} \rightarrow H_2O + 2e^- \text{ (when fuel is hydrogen)}$$

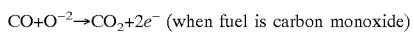
$$CO + O^{-2} \rightarrow CO_2 + 2e^- \text{ (when fuel is carbon monoxide)}$$

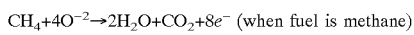
$$CH_4 + 4O^{-2} \rightarrow 2H_2O + CO_2 + 8e^- \text{ (when fuel is methane)}$$

Especially with reactants, $H_2$ and CO, a shift reaction can happen with the presence of water vapor:

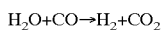
$$H_2O + CO \rightarrow H_2 + CO_2$$

This will increase the amount of hydrogen in the gas stream, which is more likely to react than carbon monoxide.

Still referring to FIG. 3, unreacted fuel and byproducts, such as water, carbon monoxide, and carbon dioxide, exit the electrochemical cell 10 in the fuel stream, as illustrated by fuel stream arrow 66, while excess oxidant exits the electrochemical cell 10, as illustrated by oxidant stream arrow 68.

Basically, the electrolyte 40 conducts these oxygen ions ($O^{-2}$) between the anode 30 and the cathode 50, maintaining an overall electrical charge balance. The cycle of flowing electrons ($e^-$) from the anode 30 through the external circuit 70 to the cathode 50 creates electrical energy for harnessing.

To facilitate the reaction in the fuel cell, a direct supply of fuel, such as hydrogen, carbon monoxide, or methane, is preferred. However, concentrated supplies of these fuels are generally expensive and difficult to supply. Therefore, the specific fuel can be supplied by processing a more complex source of the fuel. The fuel utilized in the system is typically chosen based upon the application, expense, availability, and environmental issues relating to the fuel.

Possible sources of fuel include conventional fuels such as hydrocarbon fuels, including, but not limited to, liquid fuels, such as gasoline, diesel, ethanol, methanol, kerosene, and others; gaseous fuels, such as natural gas, propane, butane, and others; alternative fuels, such as hydrogen, biofuels, dimethyl ether, and others; and synthetic fuels, such as synthetic fuels produced from methane, methanol, coal gasification or natural gas conversion to liquids, and the like; and combinations comprising at least one of the foregoing fuels. The preferred fuel is typically based upon the power density of the engine, with lighter fuels, i.e., those which can be more readily vaporized and/or fuels which are readily available to consumers, generally preferred.

The processing or reforming of hydrocarbon fuels, such as gasoline, can be completed to provide an immediate fuel source for rapid start up of the fuel cell as well as protecting the fuel cell by removing impurities. Fuel reforming can be used to convert a hydrocarbon (such as gasoline) or an oxygenated fuel (such as methanol) into a reformate (e.g., hydrogen ($H_2$) and carbon monoxide (CO)) and byproducts (e.g., carbon dioxide ($CO_2$), and water). Common approaches include steam reforming, partial oxidation, auto thermal reforming, and the like, as well as combinations comprising at least one of the foregoing approaches.

Steam reforming systems involve the use of a fuel and steam ($H_2O$) that is reacted in heated tubes filled with catalysts to convert the hydrocarbons into principally hydrogen and carbon monoxide. An example of the steam reforming reaction is as follows:

$$CH_4 + H_2O \rightarrow CO + 3H_2$$

Partial oxidation (POx) reduction reformers are based on substoichiometric combustion to achieve the temperatures necessary to reform the hydrocarbon fuel. Decomposition of the fuel to primarily hydrogen and carbon monoxide occurs through thermal reactions at high temperatures of about 700° C. to about 1,000° C. The heat required to drive the reaction is typically supplied by burning a portion of the fuel. Catalysts have been used with POx reduction systems (catalytic POx) to promote conversion of various sulfur-free fuels, such as ethanol, into synthesis gas. The use of a catalyst can result in acceleration of the reforming reactions and can provide this effect at lower reaction temperatures than those that would otherwise be required in the absence of a catalyst. An example of the POx reduction reforming reaction is as follows:

$$CH_4 + \tfrac{1}{2}O_2 \rightarrow CO + 2H_2$$

Auto thermal reforming involves the use of both steam reforming and partial oxidation reforming and produces virtually no thermal energy. The production of thermal energy from the partial oxidation reaction is offset by the thermal energy needs of the steam reforming process. An example of the auto thermal reforming reaction is as follows:

$$CH_4 + O_2 + H_2O + \text{small heat input} \rightarrow H_2 + CO + CO_2 + H_2O$$

Referring again to FIG. 1, the main reformer 122 can be any type of reformer. Here, however, a POx reduction reformer is preferred since it does not require a separate supply of water and avoids the need to recirculate anode exhaust gases (for water vapor). The water vapor that is generated in the POx reduction mode is entrained in the output for use in the SOFC stack. Unreformed fuel and air are introduced to a catalyst that reacts to produce hydrogen and carbon monoxide. To achieve the desired temperature of the main reformer 122, the catalyst can optionally be heated from an igniter, and/or a heating device can be employed during start-up. The main reformer 122 typically operates at temperatures of about 650° C. to about 1,000° C., with about 800° C. to about 900° C. preferred.

A micro-reformer 123 can be optionally employed in combination with the main reformer 122 to heat or otherwise bring the main reformer 122 up to the desired temperature. The micro-reformer 123, which can be a reformer, or catalytic or gas phase combustor, is preferably an exothermic POx reduction reformer.

The micro-reformer 123 is sized to provide sufficient heat (in a full combustion mode) and sufficient reformate (in the reforming mode) to preheat and start-up the downstream device in the desired period of time. The micro-reformer 123 is generally a fraction of the size of the main reformer 122 and is preferably designed differently than a main reformer 122. A micro-reformer 123 can utilize metal parts (e.g., heating elements) while ceramic parts are preferred for a main reformer 122 because of the continuous high operating temperatures.

The operation of the main reformer 122, and the optional micro-reformer 123, can be monitored with temperature sensors, gas pressure sensors, gas composition sensors, and combinations comprising at least one of the foregoing sensors. Internally, the main reformer 122 and the micro-reformer 123 can be plumbed in series and can operate as POx reduction reformers.

The waste energy recovery assembly 126 which is located within the hot box chamber 106 in fluid communication with the SOFC serves to convert the unused chemical energy (unused reformate) and thermal energy (exothermic reaction heat from the SOFC stack 124) to input thermal energy for the fuel cell system 200 through the use of an integration of a catalytic combustion zone and heat exchangers. Air for process control of the waste energy recovery assembly 126 can be added via the air control valve 154 in the main plenum 102. The waste energy recovery assembly 126 can receive fuel from two sources during operation. During the early part of start-up, low-grade reformate from the main reformer 122 can be routed directly to the waste energy recovery assembly 126 catalytic combustion zone. During normal operation, some or all of the reformate can be directed through the waste energy recovery assembly 126 heat exchangers to the SOFC stack 124. The output of the SOFC stack 124 (anode exhaust and cathode exhaust) can be routed back to the waste energy recovery assembly 126 catalytic zone to be mixed and catalyzed. The catalytic zone heats the integrated heat exchangers of the waste energy recovery assembly 126. During periods of high temperature operation of the waste energy recovery assembly 126 (high load), cooler air can be added to the cathode supply 132 via an air control valve 158 to blend and control the temperature to the SOFC.

The waste energy recovery assembly 126 can be a series of connected flat plate structures having one or more openings or manifold passages that border the edge of the plate for the flow of oxidant, reformate, or exhaust gases. The plates can also have etchings, chevrons, channels, or serpentines disposed in the majority of the center portion of the plates for the movement of oxidant, reformate, or exhaust. The oxidant, reformate, or exhaust enter from an inlet passage through the etchings to an outlet passage, with the direction of the flow of the oxidant, reformate, or exhaust being across the plates. A rib, divider, or stiffener extends across each plate, separating the passages to prevent the mixing of gases.

The thermal management system of the fuel cell system 200 is designed to insulate the internal hardware and maintain the exterior surface temperature at a temperature of about 90° C. or less. The thermal management system can incorporate three pressurized and segmented chambers housed in the system enclosure 100. The system enclosure 100 serves as the "outer skin" of the auxiliary power unit, supports the internal components, and can be actively temperature controlled for specific operational temperature limits. The three chambers are the main plenum chamber 102, insulation plenum chamber 104, and hot box chamber 106. The system enclosure 100 houses the main plenum 102 and the insulation plenum 104. Internal to the insulation plenum 104 is the hot box 106, which is the housing for the SOFC stack 124, fuel reformer system (e.g., 122, 123), waste energy recovery system 126, and optionally sensors, controllers, other high temperature components, and the like.

The thermal management system can employ two features to actively control the exterior surface temperature of the system enclosure 100. The first feature is a cooling air passage in the system enclosure lid 109 that incorporates a thin heat exchanger across preferably the entire lid surface. This lid surface provides the contact point to the vehicle (not shown) and therefore, preferably operates at a lower temperature than the other surfaces of the system enclosure 100. The main blower 110 inside the system enclosure 100 inducts cool air through the cooling air passage in the system enclosure lid 109, thereby cooling the surface of the system enclosure 100 in contact with the vehicle, and pressurizing the main plenum 102 to a pressure (P1). The pressure P1 is managed by the system for the best system performance and adjusts for the incoming temperature of this cooling air. Preferably, the cooling air cools the surface of the system enclosure to about 90° C. or less, with 80° C. or less preferred, about 60° C. or less more preferred and about 45° C. or less especially preferred.

The second feature of the thermal management system is a porous insulation (or active insulation) layer 105 disposed between the insulation plenum 104 and the hot box 106. The system enclosure 100 and the insulation layer 105 can be cooled through the controlled flow of air 161 at a pressure (P2) through the insulation plenum chamber 104 into the hot box chamber 106 that is preferably maintained to a pressure (P3) lower than the pressure P2 of the air flow. The airflow is controlled by air control valve 160 in order to provide the desired flow rate and pressure to attain the appropriate degree of cooling. Once in the hot box chamber 106, the air, now referred to as the enclosure purge air 164 can be exhausted through the waste energy recovery assembly 126 to the exterior of the system enclosure via air valve 107. The active insulation cooling controls the exterior temperature of the hot box 106 preferably to a temperature of about 200° C. or less with about 150° C. or less preferred, and about 100° C. or less more preferred. It is further preferred to maintain the hot box 106 at a temperature of about 80° C. or less.

A cooling airflow is provided to the thermal management system by a process air system. A supply of air 103, exterior to the system enclosure 100, provides air to the SOFC system 200. The supply of air 103 is optionally processed in an air filter 108 and directed through a cooling air passage in the enclosure lid 109 to the main blower 110. The main blower 110 is located within the main plenum chamber 102, which is preferably separated from the insulation plenum chamber 104 by a plenum bulkhead plate 113. The air entering the main blower 110 exits through valve 112 into the process air system in the main plenum chamber 102. Also located within the main plenum chamber 102 are fuel injectors 140, 142, air control valves 150, 152, 154, 156, 158, 160, and an electrical actuator 162.

The main blower 110 pressurizes the chambers (main plenum 102, insulation plenum 104, and hot box 106) for cooling and purging of the SOFC system. The blower 110 draws air over the top horizontal face of the system enclosure 100. This air path preferably cools the top surface of the system enclosure to a temperature of about 45° C. or less, which is within the limits for attachment to a vehicle. The pressurized air P1 is discharged into the main plenum 102 and metered thru a series of air control valves. This air control valve design provides an "upstream air control" and places the control valve system (except the reformate control valve) in the cooler main plenum chamber 102.

The system mechanization of a SOFC system 200 comprises a system enclosure 100 having a main plenum chamber 102, an insulation plenum chamber 104 and a hot box chamber 106. The main plenum chamber 102 comprises process air system controls (e.g., blowers, fuel injectors, air control valves). The insulation plenum chamber 104 aids in regulating the thermal management system and comprises an open area 111 for airflow and an active porous insulation layer 105. The hot box chamber 106 can comprise a SOFC stack 124, including a gas distribution manifold 120, a main reformer 122, a micro-reformer 123, and a waste energy recovery (or heat exchanger) assembly 126. These elements work in conjunction to start-up, operate under normal conditions, operate in stand by mode, and shut down the SOFC system 200 in order to enable the electrical energy being provided to the transportation vehicle to be controlled.

In order to control the SOFC system 200, the SOFC system 200 should be capable of a temperature rise of about 50° C. to about 100° C. per minute to about 600° C. to facilitate the start-up of the electrochemical fuel cell process. Additionally, following the startup process, the SOFC system should be capable of transitioning to nominal operating temperatures (i.e., about 650° C. to about 800° C.). Once at operating temperatures, the SOFC system can be operated, placed in a stand-by mode, or shut-down, dependent upon the required electrical energy needs of the vehicle.

In a typical operation of the control system for a SOFC system 200, the startup occurs at ambient temperatures (e.g., about −40° C. to about 50° C.) to a temperature of about 120° C. To startup the SOFC system 200, the main blower 110 pressurizes the main plenum 102 to the operating pressure P1 and the supply of fuel 101 enters, and thus pressurizes, the fuel system. The micro-reformer 123 can be then started, for example, by energizing the electrically heated element in the fuel vaporization zone and receiving a supply of fuel 141 from the fuel injector 140 and a supply of air 151 from the main plenum 102 via air control valve 150, producing a pre-reformate. The output pre-reformate (e.g., heated pre-reformate) 144 is routed through the catalyst, producing thermal energy to heat the main reformer 122. The heated output reformate 144 can also be utilized to heat the waste energy recovery assembly 126 and the SOFC stack 124. The output pre-reformate 144 of the micro-reformer 123 is discharged into the preheated chamber of the main reformer 122.

Once the main reformer has attained a sufficient temperature, the main reformer 122 receives a supply of fuel 143 from the fuel injector 142 and a supply of air 153 from the main plenum 102 via the air control valve 152, and begins production of a supply of reformate (or a main reformate) 145. The main reformate 145 can be routed through the reformats control valve 125 to the waste energy recovery assembly 126. Upon sufficient time and temperature rise of the SOFC stack 124 with the cathode air 132 heating, the main reformer 122 output to the reformate control valve 125 can then switch ports and begin to route heated reformate 130 to the SOFC stack 124. The output of the reformer system (e.g., the main reformer 122 and the micro-reformer 123) can be monitored to maintain sufficient performance with pressure sensors, sampling analysis sensors, temperature sensors, and combinations comprising at least one of the foregoing sensors.

The SOFC system should be capable of transitioning to normal operations. This occurs at the point when the main reformer 122 is producing a main reformate and thermal output, to allow for the supply of reformate 145 to be routed to the waste energy recovery assembly 126 via the reformate control valve 125. This fast transition to normal operations can occur at a temperature of about 600° C., or greater, to a temperature of about 650° C. to about 1,000° C., with about 650° C. to 800° C. preferred. The reformate control valve 125 routes the heated supply of reformats 146 through the waste energy recovery assembly 126. The waste energy recovery assembly 126 catalytically combusts the reformats 146 to provide thermal energy to the cathode supply 132 and anode supply 130. The fast transition process continues until the SOFC stack 124 modules achieve a minimum operating temperature of about 650° C., the main reformer is producing reformate, and an electrical demand (or load) can be applied to the SOFC stack 124. A load can be applied to the SOFC stack 124 when the SOFC stack modules are at about 65% rated no-load voltage (about 0.70 volts per cell). At this point, the SOFC system is operating at normal conditions, for example having a temperature of about 600° C. or greater, with about 650° C. to about 800° C. preferred.

At normal operating conditions, the SOFC stack 124 is engineered to deliver the most efficient power and durability. The SOFC system 200 responds to an increased electrical demand (load) by adjusting the quantities of the anode supply 130 and/or the cathode supply 132. The main reformate 145 and the cathode air control valve 156 are adjusted to optimize the fuel utilization. This can be accomplished by inputs to the control system from temperature sensors, pressure sensors, gas sensors, and combinations comprising at least one of the foregoing sensors.

Shutdown from normal operating conditions comprises the cooling of the system to near ambient conditions for long-term in operation (i.e., from hours to days). A shut down transition to an ambient temperature of the SOFC stack 124 occurs from normal operating conditions (i.e., a temperature of about 600° C. or greater) to shutdown conditions (i.e., a temperature of less than about 200° C.). In order to begin the transition to shutdown, the electrical load required from the system can be removed and the anode supply 130 can be reduced to a minimum flow necessary to prevent anode oxidation from occurring on the anode side of the electrochemical cells (i.e., the anode oxidation period). In order to shutdown the SOFC system 200, the supply of air 103 is preferably maintained to cool the SOFC system 200. The airflow rate through the SOFC system 200 can be maintained at a velocity sufficient to keep the electronic components in the main plenum 102 at an operable temperature. This allows for the cooling of the SOFC stack 124 and for the exhausting of any stored thermal energy through the waste energy recovery assembly 126 via inlet 164. This is accomplished by continuing to direct a supply of air via cathode air supply 132 into the SOFC stack 124 and continuing to direct a supply of air via air control valve 160 into the thermal enclosures (e.g., 104 and 106). The system will continue this process of air cooling until the SOFC stack 124 is below the minimum temperature threshold of when anode oxidation occurs (i.e., about 200° C.), at which time the main reformer 122 can then be shutdown. However, the process air system can continue to cool the system enclosure 100 to enable easy handling and storage (e.g., to a temperature of less than about 45° C.).

Instead of completely shutting down, the system can be operated in a standby (or hold) mode. This mode of operation is desirable so that during short periods of inactivity, energy consumption by the SOFC system and thermal enclosure is reduced. The standby mode maintains the temperature of the SOFC system 200 at about 400° C. to about 600° C. At this temperature, minimal energy is lost from the reformer system and the thermal management system. In standby mode, the SOFC stack 124 is maintained at, or near, operational temperatures in order to respond faster to an electrical load request. Yet, during standby mode the airflow and pressures are preferably operated at normal operating conditions to reduce the thermal energy emitting from the system enclosure 100 to enable easy handling of the system.

The SOFC stack, the micro-reformer, the main reformer, and the WER assembly work in conjunction with the thermal management system for the operation of a transportation vehicle. These components and related plumbing are encapsulated in a highly insulated system enclosure that can be actively cooled by incoming purge air. This controlled cooling air serves to maintain reasonable exterior temperatures, while keeping the quantity of insulation utilized low. It also serves to purge the enclosure from the accumulation of any environmentally unfriendly gases. The system uses a low-pressure blower to feed pressurized air into system chambers that contain the required process control valves, in order to keep them housed "upstream" of the high temperature regions, thereby reducing the cost.

The reformer system avoids the need to recirculate anode exhaust gases (for water vapor) by operating in POx reduction mode, thus additional water is not necessary for operation. The water vapor generated in the POx reduction mode is entrained in the output for use in the SOFC stack. The start-up and preheating of the system are accomplished by the reformer system and the waste energy recovery assembly through the heating and circulating of hot gases. This reduces the need for additional electrical heaters and for the electrical energy that would be required.

The SOFC system provides for the utilization of automotive derived fuels and components (i.e., air control actuators) and is compatible with existing fuel infrastructures and fuels.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of starting a solid oxide fuel cell system, comprising:

pressurizing a main plenum to a first pressure, wherein said main plenum comprises a first supply of fuel, blowers, and air control valves;

directing said first supply of fuel and a first supply of air to a preheated micro-reformer;

creating a heated pre-reformate in said micro-reformer;

discharging said heated pre-reformate from said micro-reformer to a main reformer;

preheating said main reformer with said preheated pre-reformate;

introducing a second supply of fuel and a second supply of air to said main reformer;

creating a heated main reformate in said main reformer;

directing said heated main reformate to a waste energy recovery assembly;

heating a cathode supply in said waste energy recovery system; and directing said heated cathode supply to heat said solid oxide fuel cell stack.

2. The method of claim 1, wherein said solid oxide fuel cell stack is at an ambient temperature of about −40° C. to about 50° C., and is heated to a temperature of up to about 120° C.

3. The method of claim 1, further comprising directing said heated pre-reformate and said heated main reformate through a reformate control valve.

4. The method of claim 1, further comprising electrically preheating said micro-reformer.

5. The method of claim 1, further comprising monitoring said heated main reformate with a sensor selected from the group consisting of pressure sensors, temperature sensors, and combinations comprising at least one of the foregoing sensors.

6. The method of claim 1, further comprising directing said heated pre-reformate and said heated main reformate through said waste energy recovery assembly to said solid oxide fuel cell stack.

7. A method of transitioning a solid oxide fuel cell system to normal operating conditions, comprising:

operating a main reformer to produce a reformate;

directing said reformate in a first stream and second stream to a waste energy recovery assembly;

catalytically combusting said first stream of said reformate in said waste energy recovery assembly;

producing thermal energy in said waste energy recovery assembly to heat said second stream of said reformate and a supply of air;

directing said second stream of said reformate and said supply of air to a solid oxide fuel cell stack; and heating said solid oxide fuel cell stack to a temperature of about 600° C. or greater.

8. The method of claim 7, further comprising directing said reformate through a reformate control valve.

9. The method of claim 7, wherein said solid oxide fuel cell stack is at a temperature of about 120° C. or greater and is heated to a temperature of about 600° C. to about 1,000° C.

10. The method of claim 9, wherein said solid oxide fuel cell stack is heated to about 650° C. to about 800° C.

11. A method of operating a solid oxide fuel cell system, comprising:

directing a supply of reformate from a waste energy recovery assembly to a solid oxide fuel cell stack;

using said supply of reformate and a supply of air in said solid oxide fuel cell stack;

producing electrical energy in said solid oxide fuel cell stack;

harnessing said electrical energy;

sensing a condition of said reformate; and adjusting said supply of reformate and/or said supply of air, based upon said condition, to meet a demand by a vehicle for said electrical energy.

12. The method of claim 11, wherein said condition is selected from the group consisting of temperature, pressure sensor, gas content, and combinations comprising at least one of the foregoing conditions.

13. A method of shutting down a solid oxide fuel cell system, comprising:

maintaining a supply of air to a solid oxide fuel cell stack and at least one thermal enclosure;

decreasing a supply of reformate to said solid oxide fuel cell stack;

stopping said supply of reformate after an anode oxidation period has passed; and stopping said supply of air to said solid oxide fuel cell stack.

14. The method of claim 13, further comprising maintaining said supply of reformate at a sufficient flow to prevent anode oxidation during said anode oxidation period.

15. The method of claim 13, wherein said solid oxide fuel cell stack is to about 200° C. or less.

16. The method of claim 13, further comprising cooling a system enclosure with said supply of air to a temperature of about 45° C. or less.

17. The method of claim 13, further comprising exhausting stored thermal energy through a waste energy recovery assembly with said supply of air.

18. A method of operating a solid oxide fuel cell system, comprising:

directing a supply of reformate and a supply of air to a solid oxide fuel cell stack;

operating said solid oxide fuel cell stack;

reducing said supply of reformate and said supply of air to said solid oxide fuel cell stack; and maintaining said solid oxide fuel cell stack at a standby temperature of about 400° C. to about 600° C.

19. The method of claim 18, further comprising transitioning said solid oxide fuel cell system from said standby temperature to an operating of about 600° C. or less based upon a vehicle load request.

20. A solid oxide fuel cell mechanization for a transportation vehicle, comprising:

a solid oxide fuel cell stack;

a reformer system disposed in fluid communication with said solid oxide fuel cell stack, wherein said reformer system comprises a main reformer and a micro-reformer;

a waste energy recovery assembly disposed in fluid communication with said solid oxide fuel cell stack and said reformer system;

a system enclosure disposed around said solid oxide fuel cell stack, said waste energy recovery assembly, and said reformer system;

a thermal management system disposed within said system enclosure, wherein said thermal management system comprises a main plenum and an insulation plenum enclosing a chamber, said chamber comprising said solid oxide fuel cell stack, said reformer system, and said waste energy recovery system; and a process air supply disposed in fluid communication with said thermal management system.

21. The mechanization of claim 20, wherein said micro-reformer and said main reformer are partial oxidation reformers.

22. The mechanization of claim 20, wherein said insulation plenum comprises an active porous insulation.

23. The mechanization of claim 20, further comprising a plenum bulkhead disposed in contact with said main plenum and said insulation plenum.

24. The mechanization of claim 20, further comprising a main blower, air control valves, and an actuator in said main plenum.

25. The mechanization of claim 20, further comprising an enclosure lid cooling air passage in thermal communication with said main plenum.

26. The mechanization of claim 20, further comprising a reformate control valve in fluid communication with said reformer system.

\* \* \* \* \*